United States Patent
An

(10) Patent No.: US 9,274,675 B2
(45) Date of Patent: Mar. 1, 2016

(54) MOBILE TERMINAL AND CONTROL METHOD THEREOF

(75) Inventor: Geumju An, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 300 days.

(21) Appl. No.: 13/533,853

(22) Filed: Jun. 26, 2012

(65) Prior Publication Data

US 2013/0135294 A1    May 30, 2013

(30) Foreign Application Priority Data

Nov. 28, 2011 (KR) .......................... 10-2011-0125264

(51) Int. Cl.
*G06F 3/0481* (2013.01)
*G06F 3/0488* (2013.01)
*G06F 3/0482* (2013.01)
*G06F 9/44* (2006.01)

(52) U.S. Cl.
CPC .......... *G06F 3/04815* (2013.01); *G06F 3/0482* (2013.01); *G06F 3/0488* (2013.01); *G06F 3/04817* (2013.01); *G06F 9/4443* (2013.01)

(58) Field of Classification Search
None
See application file for complete search history.

(56) References Cited

U.S. PATENT DOCUMENTS

| | | | |
|---|---|---|---|
| 6,868,283 B1 | 3/2005 | Bonansea et al. | |
| 7,013,435 B2 * | 3/2006 | Gallo et al. | 715/850 |
| 7,380,038 B2 * | 5/2008 | Gray | 710/243 |
| 8,046,403 B2 * | 10/2011 | Mazzaferri | 709/202 |
| 9,134,891 B1 * | 9/2015 | Schultz | G06F 3/0486 |
| 2010/0093400 A1 | 4/2010 | Ju et al. | |
| 2010/0115455 A1 * | 5/2010 | Kim | 715/781 |
| 2010/0182265 A1 * | 7/2010 | Kim | G06F 1/1616 345/173 |
| 2011/0134110 A1 | 6/2011 | Song et al. | |
| 2011/0246950 A1 * | 10/2011 | Luna et al. | 715/848 |
| 2012/0131495 A1 * | 5/2012 | Goossens et al. | 715/782 |

OTHER PUBLICATIONS

European Patent Office Application Serial No. 12004935.8, Search Report dated Mar. 13, 2013, 7 pages.

* cited by examiner

*Primary Examiner* — Xiao Wu
*Assistant Examiner* — Steven Elbinger
(74) *Attorney, Agent, or Firm* — Lee, Hong, Degerman, Kang & Waimey

(57) ABSTRACT

A mobile terminal for displaying a three-dimensional image and a control method thereof are provided. The mobile terminal includes: a display unit configured to display a three-dimensional image including a plurality of objects; a memory unit configured to store property information of a plurality of applications respectively corresponding to the plurality of objects; and a controller configured to, upon detection of a selection of the plurality of objects, execute the plurality of applications, generate priority information in order to determine the priority levels of the executed applications based on the property information, and arrange the executed applications on the three-dimensional image based on position information mapped to the priority information.

10 Claims, 15 Drawing Sheets

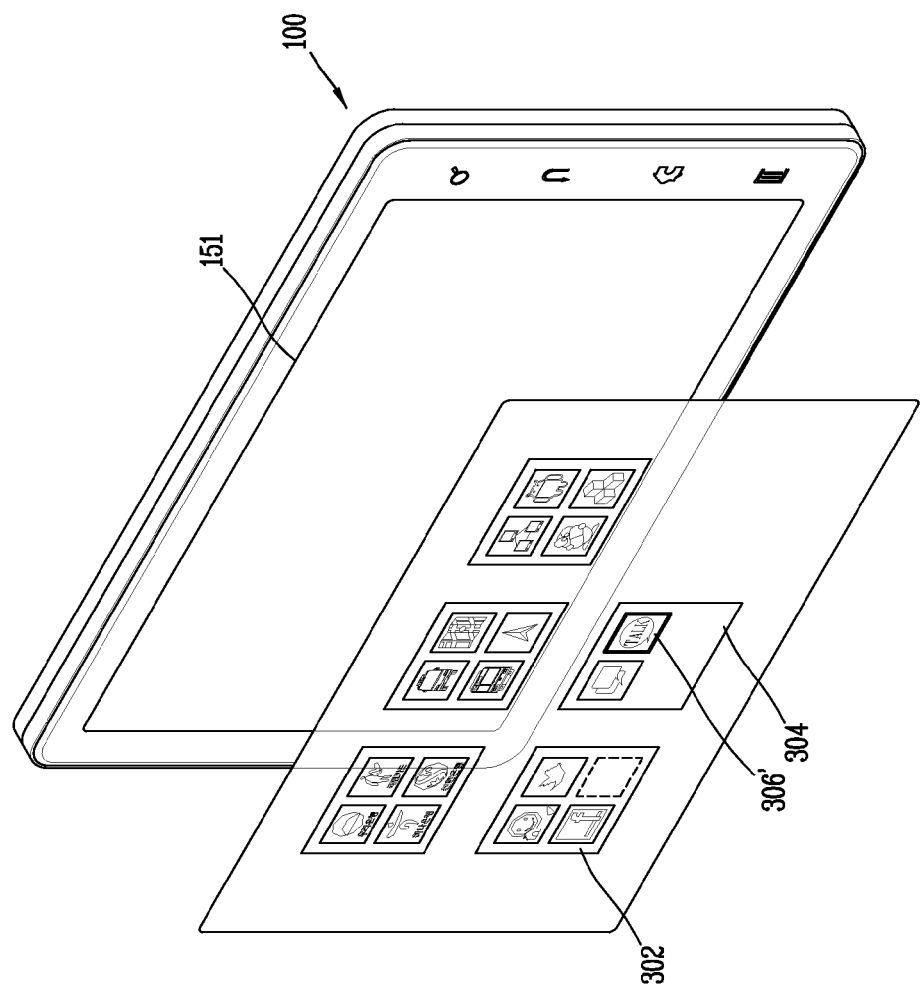

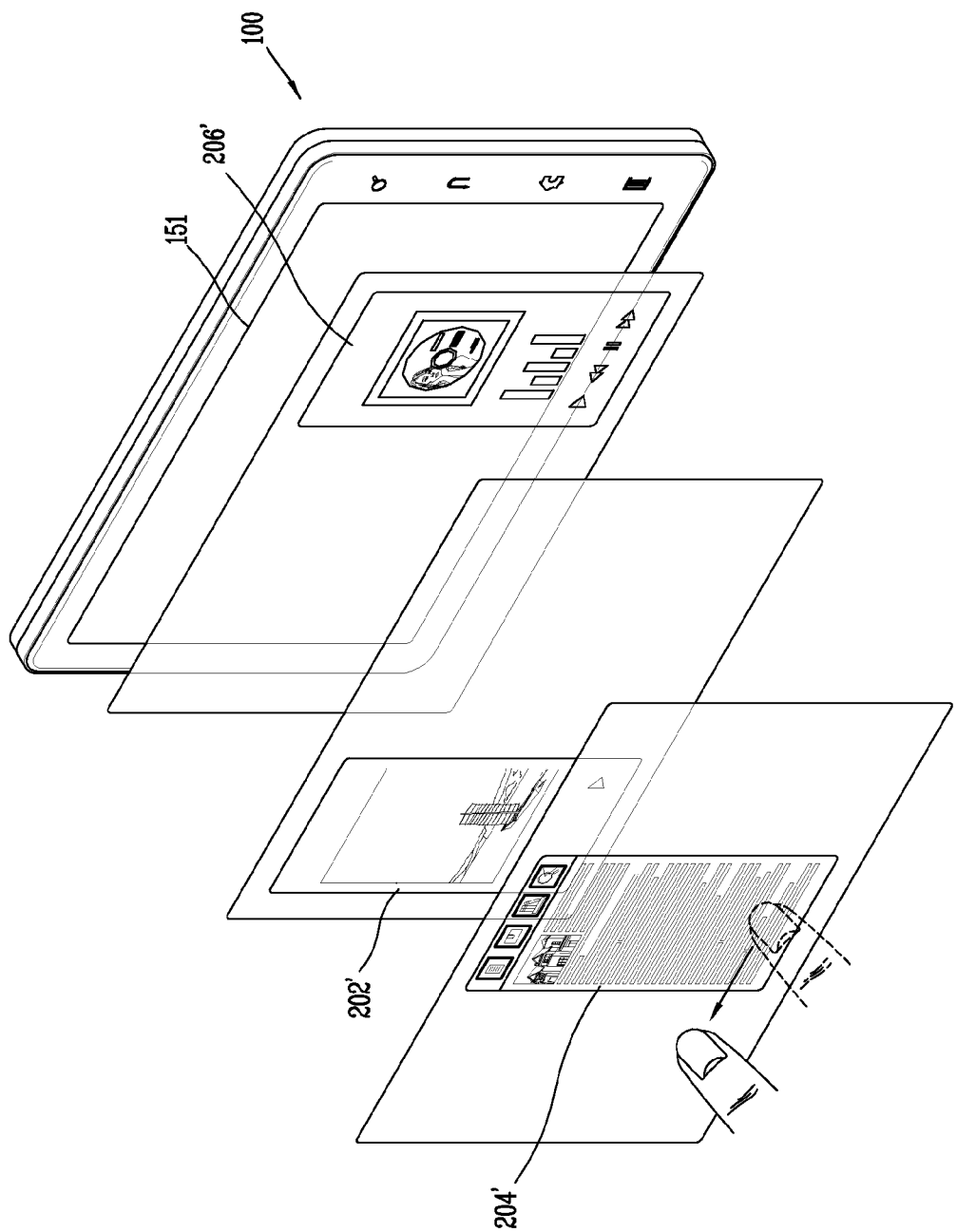

MOBILE TERMINAL AND CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2011-0125264, filed on Nov. 28, 2011, the contents of which is incorporated by reference herein in its entirety.

BACKGROUND OF THE INVENTION

1. Field of the Invention

The present disclosure relates to a mobile terminal, and particularly, to a mobile terminal for displaying a 3D image, and a control method thereof.

2. Background of the Invention

Terminals can be classified into a mobile terminal and a stationary terminal based on its mobility. Furthermore, terminals can be further classified into a handheld terminal and a vehicle mount terminal based on whether or not the terminal can be directly carried by a user.

As it becomes multifunctional, the mobile terminal can capture still or moving images, play music or video files, play games, receive broadcast and the like, so as to be implemented as an integrated multimedia player. Moreover, in order to support and enhance the function of the terminal, improvements of the terminal may be considered in the aspect of structure or software.

Thanks to such improvements, mobile terminals with a multi-tasking function for simultaneously performing a plurality of applications are mass-produced. Even if the multi-tasking function is provided, however, there is the inconvenience of entering multiple execution commands for applications in order to execute a plurality of applications. Moreover, it is difficult to display a plurality of applications executed by multi-tasking simultaneously on a screen due to limited screen sizes of mobile phones.

SUMMARY OF THE INVENTION

Therefore, an aspect of the detailed description is to provide a user interface which makes multi-tasking easier in a mobile terminal and makes better use of multi-tasking.

To achieve these and other advantages and in accordance with the purpose of this specification, as embodied and broadly described herein, a mobile terminal according to an embodiment of the present invention includes: a display unit configured to display a three-dimensional image including a plurality of objects; a memory unit configured to store property information of a plurality of applications respectively corresponding to the plurality of objects; and a controller configured to, upon detection of a selection of the plurality of objects, execute the plurality of applications, generate propriety information so as to determine the priority levels of the executed applications based on the property information, and arrange the executed applications on the three-dimensional image based on position information mapped to the priority information.

In an embodiment, the depth of each of the applications arranged on the three-dimensional image is set based on the priority information.

In an embodiment, when the three-dimensional image is converted into a two-dimensional image, the controller terminates at least one of the executed applications based on the priority information.

In an embodiment, when an event occur, with the executed applications arranged on the three-dimensional image, the controller terminates at least one of the executed applications based the priority information and executes the event. Further, when the event is executed, the controller updates the priority information such that the executed event has a higher priority level than the executed applications. Further, the controller arranges the executed event on the three-dimensional image in accordance with the update of the priority information. Further, when the executed event is terminated, the controller re-initiates the at least one terminated application.

In an embodiment, when the output of data allocated to one of the executed applications is completed, the controller controls the application so as to output at least some of the data allocated to the other applications.

In an embodiment, the controller distributes hardware resources to the executed applications based on the priority information.

In an embodiment, each of the selected objects includes a plurality of folders for grouping icons. Further, upon detection of repeating icons from the plurality of folders, the controller deletes at least one of the repeating icons.

In an embodiment, the plurality of objects are selected based on a multi-touch input on the three-dimensional image. Further, the multi-touch input includes a first touch input corresponding to a static gesture input for indicating a point on the three-dimensional image and a second touch input corresponding to a dynamic gesture input for moving between the regions in which the plurality of objects are displayed.

A control method of a mobile terminal according an embodiment of the present invention includes the steps of: displaying a three-dimensional image including a plurality of objects; upon detection of a selection of the plurality of objects, executing applications respectively corresponding to the plurality of objects; generating priority information so as to determine the priority levels of the executed applications based on the property information; and arranging the executed applications on the three-dimensional image based on position information mapped to the priority information.

In an embodiment, in the step of arranging the three-dimensional image, the depth of each of the applications arranged on the three-dimensional image is set based on the priority information.

In an embodiment, the control method further includes the step of, when the three-dimensional image is converted into a two-dimensional image, terminating at least one of the executed applications based on the priority information.

In an embodiment, the control method further includes the step of, when an event occur, with the executed applications arranged on the three-dimensional image, terminating at least one of the executed applications based the priority information and executes the event. Further, the control method further includes the steps of: when the event is executed, updating the priority information such that the executed event has a higher priority level than the executed applications; and arranging the executed event on the three-dimensional image in accordance with the update of the priority information. Further, the control method further includes the step of, when the executed event is terminated, re-initiating the at least one terminated application.

In an embodiment, the control method further includes the step of, when the output of data allocated to one of the executed applications is completed, controlling the application so as to output at least some of the data allocated to the other applications.

A mobile terminal according to an embodiment of the present invention includes: a display unit configured to display a three-dimensional image including a plurality of objects; and a controller configured to, upon detection of a selection of the plurality of objects, execute applications respectively corresponding to the selected objects, and arrange the executed applications on the three-dimensional image based on position information mapped to the order of the selected objects.

In an embodiment, the depth of each of the applications arranged on the three-dimensional image is set based on the selection order.

In an embodiment, when the three-dimensional image is converted into a two-dimensional image, the controller terminates at least one of the executed applications based on the selection order.

In an embodiment, when an event occur, with the executed applications arranged on the three-dimensional image, the controller terminates at least one of the executed applications based the selection order and executes the event.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 8A and 8B are conceptual diagrams showing a user interface of a mobile terminal to which the control method shown in FIG. 7 is applied;

FIGS. 10A and 10B are conceptual diagrams showing a user interface of a mobile terminal employing the control method shown in FIG. 9 is applied.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

A terminal may be implemented in various types. For instance, the terminal in the present description includes a mobile terminal such as a portable phone, a smart phone, a notebook computer, a digital broadcasting terminal, Personal Digital Assistants (PDA), Portable Multimedia Player (PMP) and a navigation system, and a fixed terminal such as a digital TV and a desktop computer. It is assumed that the terminal of the present invention is a mobile terminal. However, it will be obvious to those skilled in the art that the present invention may be also applicable to the fixed terminal, except for specific configurations for mobility.

Figure 1:
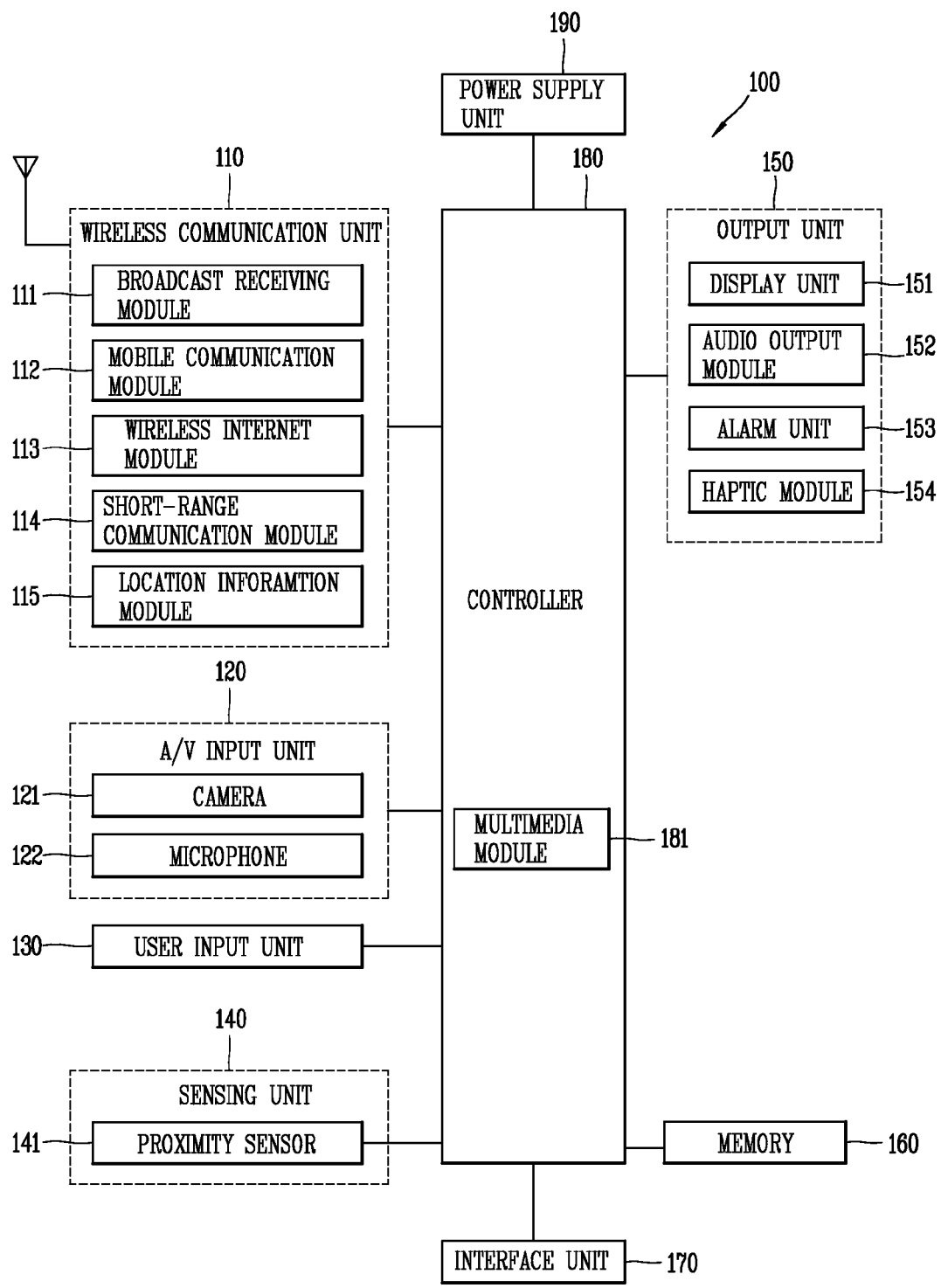
FIG. 1 is a block diagram showing a mobile terminal associated with the present invention.

FIG. 1 is a block diagram of a mobile terminal 100 according to one embodiment of the present disclosure.

The mobile terminal 100 may comprise components, such as a wireless communication unit 110, an Audio/Video (A/V) input unit 120, a user input unit 130, a sensing unit 140, an output module 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

Hereinafter, each component (110~190) is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives a broadcast signal and/or broadcast associated information from an external broadcast managing entity via a broadcast channel. The broadcast associated information may indicate information relating to a broadcasting channel, a broadcasting program or a broadcasting service provider. The broadcast associated information may be provided through a mobile communication network. In this case, the broadcast associated information may be received via the mobile communication module 112. Broadcasting signals and/or broadcasting associated information may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUE- TOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video (telephony) call mode or a capturing mode. The processed image frames may be displayed on a display unit 151. The image frames processed by the camera 121 may be stored in the memory 160 or transmitted to the exterior via the wireless communication unit 110. Two or more cameras 121 may be provided according to the use environment of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touch-pad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the orientation of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling or other connection between the interface unit 170 and an external device and the like.

Moreover, the sensing unit 140 may include a proximity sensor 141. And, the sensing unit 140 may include a touch sensor (not shown) for detecting a touch operation on the display unit 151.

The touch sensor may be implemented as a touch film, a touch sheet, a touch pad, and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When the display unit 151 and the touch sensor have a layered structure therebetween, the display unit 151 may be used as an input device rather than an output device. The display unit 151 may be referred as 'touch screen'.

When touch inputs are sensed by the touch screen, corresponding signals are transmitted to a touch controller (not shown). The touch controller processes the received signals, and then transmits corresponding data to the controller 180. Accordingly, the controller 180 may sense which region of the display unit 151 has been touched.

When the touch screen is implemented as a capacitance type, proximity of a pointer to the touch screen is sensed by changes of an electromagnetic field. In this case, the touch screen (touch sensor) may be categorized into a proximity sensor 141.

The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on.

In the following description, for the sake of brevity, recognition of the pointer positioned to be close to the touch screen without being contacted will be called a 'proximity touch', while recognition of actual contacting of the pointer on the touch screen will be called a 'contact touch'.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The output unit 150 is configured to provide outputs in a visual, audible, and/or tactile manner (e.g., audio signal, video signal, alarm signal, vibration signal, etc.). The output unit 150 may include the display unit 151, an audio output module 153, an alarm unit 154 and a haptic module 155.

The display unit 151 may display information processed in the mobile terminal 100. For example, when the mobile terminal is operating in a phone call mode, the display unit 151 will provide a User Interface (UI) or a Graphic User Interface (GUI) which includes information associated with the call. As another example, if the mobile terminal is in a video call mode or a capturing mode, the display unit 151 may additionally or alternatively display images captured and/or received, UI, or GUI.

The display unit 151 may include at least one of a Liquid Crystal Display (LCD), a Thin Film Transistor-Liquid Crystal Display (TFT-LCD), an Organic Light-Emitting Diode (OLED), a flexible display, a three-dimensional (3D) display and an e-ink display.

Some of the displays can be configured to be transparent such that it is possible to see the exterior therethrough. These displays may be called transparent displays. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

The audio output module 153 may output audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function (e.g., a call signal reception sound, a message reception sound, etc.) performed in the mobile terminal 100. The audio output module 153 may include a receiver, a speaker, a buzzer, etc.

The alarm unit 154 outputs a signal for informing about an occurrence of an event of the mobile terminal 100. Events generated in the mobile terminal may include call signal reception, message reception, key signal inputs, and the like. In addition to video or audio signals, the alarm unit 154 may output signals in a different manner, for example, to inform about an occurrence of an event. For example, the alarm unit 154 may output a signal in the form of vibration. When a call signal is received or a message is received, the alarm unit 154 may vibrate the mobile terminal through a vibration means. Or, when a key signal is inputted, the alarm unit 154 may vibrate the mobile terminal 100 through a vibration means as a feedback with respect to the key signal input. Through the vibration, the user may recognize the occurrence of an event. A signal for notifying about the occurrence of an event may be output to the display unit 151 or to the audio output module 153.

The haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100. The haptic module 155 may be provided to a place which is frequently in contact with the user. For example, the haptic module 155 may be provided to a steering wheel, a gearshift, a lever, a seat, and the like.

The memory 160 may store software programs used for the processing and controlling operations performed by the controller 180, or may temporarily store data (e.g., a map data, phonebook, messages, still images, video, etc.) that are inputted or outputted. The memory 160 may store data on various vibrations and sounds outputted when touch input on the touch screen is sensed.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180. The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, a method for processing a user's input on the mobile terminal 100 will be explained.

The user input unit 130 is manipulated to receive a command for controlling the operation of the mobile terminal 100, and may include a plurality of manipulation units. The manipulation units may be referred to as manipulating portions, and may include any type of ones that can be manipulated in a user's tactile manner.

Various types of visible information may be displayed on the display unit 151. Such information may be displayed in several forms, such as character, number, symbol, graphic, icon or the like. Alternatively, such information may be implemented as a 3D stereoscopic image. For input of the information, at least one of characters, numbers, graphics or icons may be arranged and displayed in a preset configuration, thus being implemented in the form of a keypad. Such keypad may be called 'soft key.'

The display unit 151 may be operated as a single entire region or by being divided into a plurality of regions. For the latter, the plurality of regions may cooperate with one another. For example, an output window and an input window may be displayed at upper and lower portions of the display unit 151, respectively. Soft keys representing numbers for inputting telephone numbers or the like may be output on the input window. When a soft key is touched, a number or the like corresponding to the touched soft key is output on the output window. Upon manipulating the manipulation unit, a call connection for a telephone number displayed on the output window is attempted, or a text output on the output window may be input to an application.

In addition to the input manner illustrated in the embodiments, the display unit 151 or the touch pad may be scrolled to receive a touch input. A user may scroll the display unit 151 or the touch pad to move a cursor or pointer positioned on an object (subject), e.g., an icon or the like, displayed on the display unit 151. In addition, in case of moving a finger on the display unit 151 or the touch pad, the path of the finger being moved may be visibly displayed on the display unit 151, which can be useful upon editing an image displayed on the display unit 151.

One function of the mobile terminal may be executed in correspondence with a case where the display unit 151 (touch screen) and the touch pad are touched together within a preset time. An example of being touched together may include clamping a body with the user's thumb and index fingers. The one function, for example, may be activating or deactivating of the display unit 151 or the touch pad.

Figure 2A:
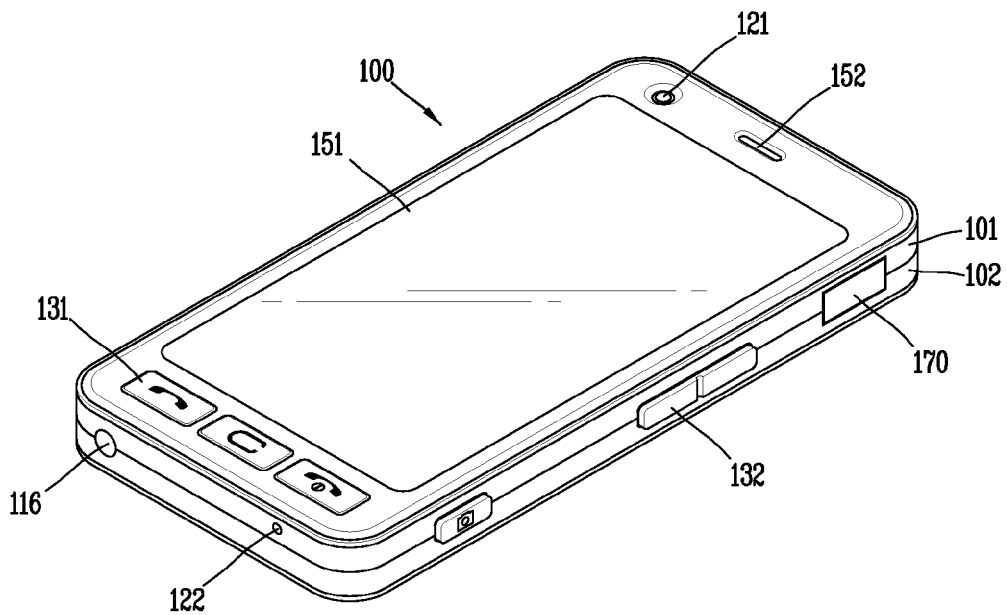
FIGS. 2A and 2B are a perspective view showing the outer appearance of a mobile terminal associated with the present invention.
Figure 2B:
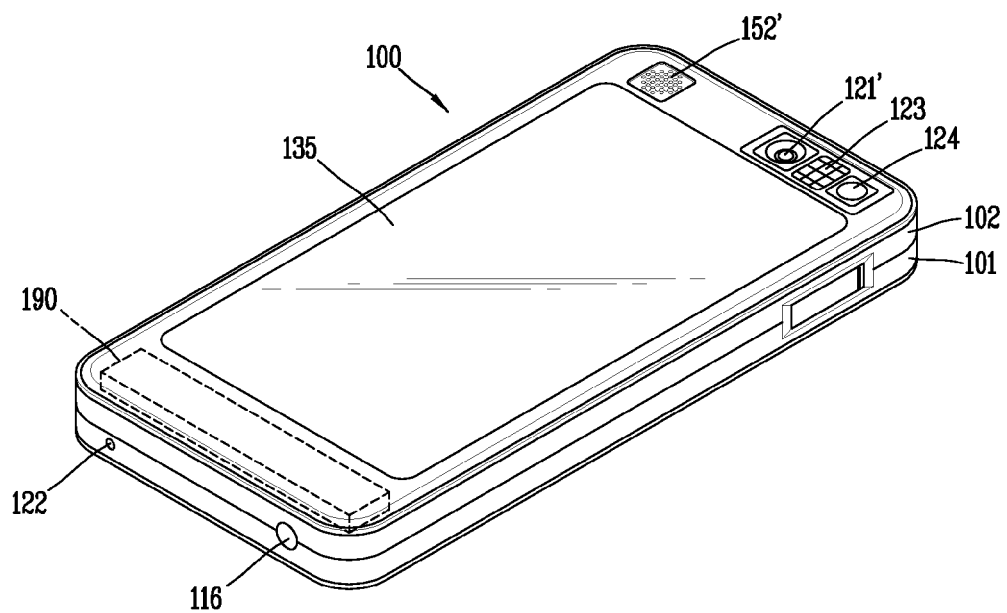

FIG. 2A is a front perspective view of the mobile terminal 100 according to an embodiment of the present invention, and FIG. 2B is a rear perspective view of the mobile terminal 100 according to an embodiment of the present invention.

Referring to FIG. 2A, the mobile terminal 100 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A body of the mobile terminal 100 has a case (casing, housing, cover, etc.) forming an outer appearance thereof. The case may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display unit 151, an audio output unit 152, a camera 121, a user input unit 130 (refer to FIG. 1), a microphone 122, an interface unit 170, etc.

The display unit 151 occupies most parts of a main surface of the front case 101. The audio output unit 152 and the camera 121 are arranged at a region adjacent to one end of the stereoscopic display unit 151, and the user input unit 131 and the microphone 122 are arranged at a region adjacent to another end of the display unit 152. A second user input unit 132, the interface unit 170, etc. may be arranged on side surfaces of the front case 101 and the rear case 102.

The user input unit 130 is manipulated to receive a command for controlling the operation of the mobile terminal 100, and may include a plurality of manipulation units 131 and 132.

Commands inputted through the first or second user input units 131 and 132 may be variously set. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display unit 151 to a touch recognition mode.

Referring to FIG. 2B, a camera 121' may be additionally provided on the rear case 102. The camera 121' faces a direction which is opposite to a direction faced by the camera 121 (refer to FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use.

The cameras 121 and 121' may be installed at the body so as to rotate or pop-up.

A flash 123 and a mirror 124 may be additionally disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 152' may be additionally arranged on a rear surface of the body. The audio output unit 152' may cooperate with the audio output unit 152 (refer to FIG. 2A) so as to implement a stereo function. Also, the audio output unit may be configured to operate as a speakerphone.

A broadcasting signal receiving antenna 116 as well as an antenna for calling may be additionally positioned on the side surface of the body. The broadcasting signal receiving antenna 116 of the broadcasting receiving module 111 (refer to FIG. 1) may be configured to be retracted into the body.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display unit 151 (refer to FIG. 2A), the touch pad 135 may be formed to be light-transmissive. The touch pad 135 may be also additionally provided with a rear display unit for outputting visual information. In this case, information output from the front and rear display units can be controlled by the touch pad 135.

The touch pad 135 operates in association with the display unit 151. The touch pad 135 may be disposed on the rear surface of the display unit 151 in parallel. The touch pad 135 may have a size equal to or smaller than that of the display unit 151.

In an embodiment of the present invention, the mobile terminal 100 may be implemented to display a three-dimensional (3D) image enabling depth perception or stereovision, as well as a two-dimensional (2D) image. The three-dimensional image may be referred to as a 3-dimensional stereoscopic image, which is rendered to give a sense of depth and reality to an object on the screen of the display unit 151, as if in a real space. The user can enjoy a more realistic user interface or content through a 3D image.

In this specification, the term "depth" refers to an index representing the difference in distance between objects included in a three-dimensional image. More specifically, if an object displayed by the display unit 151 appears to the user to be two-dimensional, the depth value of the object may be defined as "0". However, the depth of an object appearing to be a three-dimensional object protruding outward from the mobile terminal 100 with respect to the screen of the display unit 151 may be defined as a negative number. On the other hand, the depth of an object appearing to retract inward from the mobile terminal 100 may be defined as a positive number. Moreover, the closer the outwardly protruding object included in the three-dimensional image is to the user's eye, the higher the absolute value of the depth of the object is, whereas, the more distant the inwardly retracting object included in the three-dimensional image, the higher the absolute value of the depth of the object is.

Hereinafter, for the convenience of explanation, if an object included in a three-dimensional image is close to the user's eye, the depth of the object is expressed to be high, and if an object included in a three-dimensional image is distant to the user's eye, the depth of the object is expressed to be low.

Figure 3:
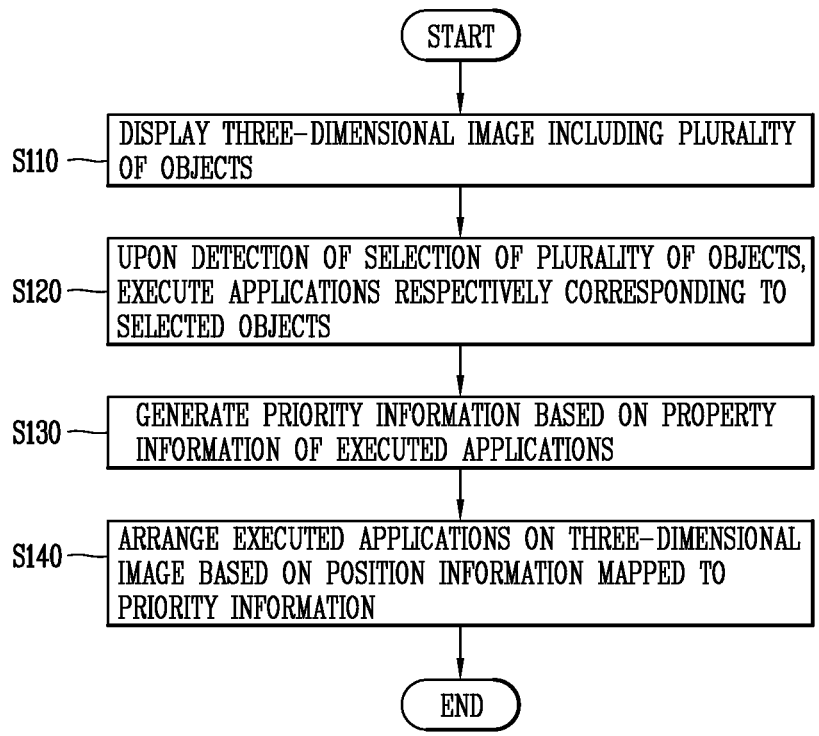
FIGS. 3 to 5 are sequential charts for explaining a control method of a mobile terminal according to an embodiment of the present invention.
Figure 4:
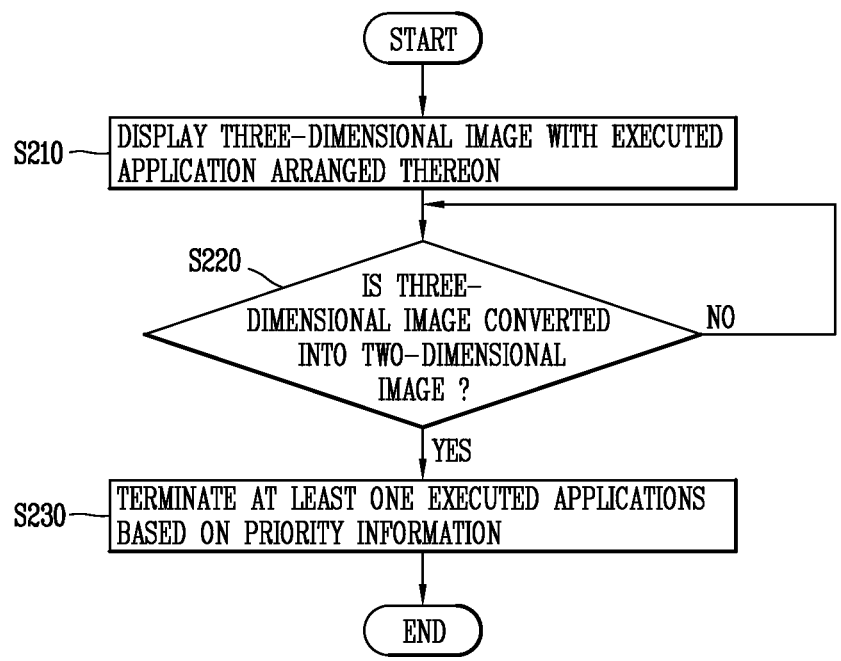
Figure 5:
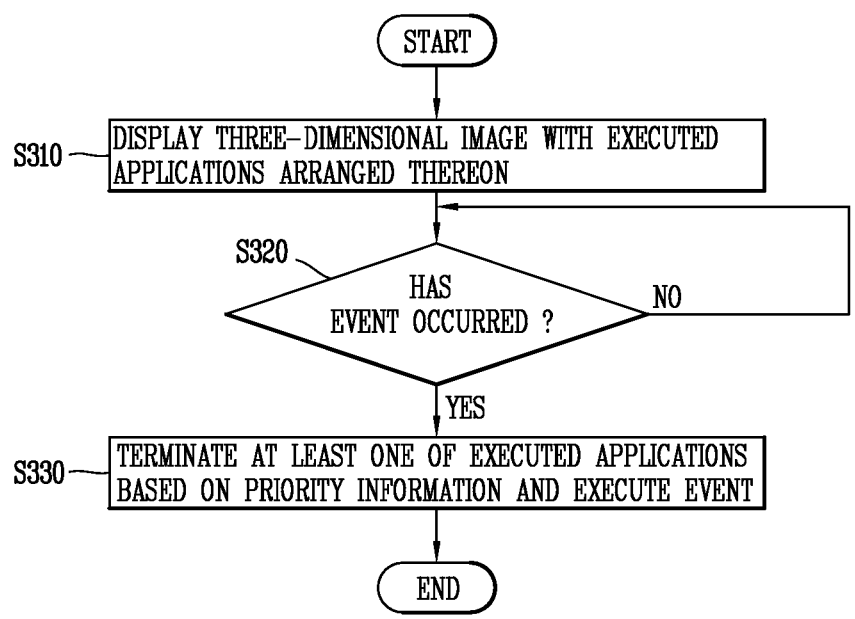

FIGS. 3 to 5 are sequential charts for explaining a control method of a mobile terminal 100 according to an embodiment of the present invention. Referring to FIG. 3, firstly, the step S110 of displaying a three-dimensional image including a plurality of objects is performed. Here, an object refers to a graphic element such as an application icon, a widget, or a thumbnail image. For example, a home screen including a plurality of application icons may be displayed in a three-dimensional format.

When a selection of a plurality of objects (e.g., icons) is detected, the step S120 of executing a plurality of applications respectively corresponding to the selected objects is performed. At this point, the objects may be selected in response to a touch input. For example, the objects may be selected in response to a drag gesture input. More specifically, the objects may be selected using coordinate values detected from the movement trajectory of a drag gesture.

In this specification, the execution of a plurality of applications involves performing a multi-tasking function. The plurality of applications may be not related, but independent from each other. That is, multi-tasking refers to simultaneously performing a plurality of applications having an equal level, rather than being limited to accompanying or supplementing an application. Here, an application refers to any of a variety of additional functions such as an online service, a messaging function, a phone function, a camera function, and playback of video or music files.

Next, the step S130 of generating priority information based on property information on the executed applications is performed. Here, the property information may include frequency of execution of each application, a memory capacity and hardware resources required to execute each application, type of digital content (e.g., text, image, video, and audio data) that each application processes and manages, and so on. The priority information may contain priority values assigned to individual applications to determine the significance of the applications.

In the embodiment of the present invention, the priority values of executed applications are not limited to being generated based on property information as described above, but also may be determined according to a user's initial settings.

Next, the step S140 of arranging the executed applications on a three-dimensional image based on position information mapped to priority information is performed. The positions represented by the position information, that is, positions on the three-dimensional image at which the executed applications are to be arranged, may be determined in advance. The depth of each application mapped on the three-dimensional image may be set based on the priority information. For example, the depth of an application with higher priority may be set to be higher than the depth of an application with lower priority.

Further, in the embodiment of the present invention, although not shown, the size of a region for displaying each application arranged on the three-dimensional image may be set based on the priority information. For example, the size of a region for displaying an application with lower priority may be set to be larger than the size of a region for displaying an application with higher priority. By the way, the size of a region for displaying each application may be set on a two-dimensional image in the same manner as described above for the three-dimensional image.

As described above, according to the mobile terminal 100 of the present invention, when a selection of a plurality of objects included in a three-dimensional image is detected in response to a user gesture, the applications respectively corresponding to the selected objects may be simultaneously executed. Accordingly, user convenience in performing multi-tasking can be improved.

Moreover, applications considered as relatively high priority may be displayed to be more highlighted than other applications by setting the priority levels of executed applications and arranging the executed applications on a three-dimensional image based on the priority levels.

FIGS. 4 and 5 explain an embodiment of an additional control method of a mobile terminal which is to be performed when applications respectively corresponding to selected objects are executed. Referring to FIG. 4, firstly, the step S210 of displaying the three-dimensional image with the executed applications arranged thereon is performed. Afterwards, the step S220 of determining whether or not the three-dimensional image on which the executed applications are arranged are converted into a two-dimensional image is performed.

When the three-dimensional image is converted into a two-dimensional image, the step S230 of terminating at least one of the executed applications based on the priority information is performed. For example, when the three-dimensional image is converted into a two-dimensional image, at least one application with relatively low priority among the applications included in the three-dimensional image may be terminated, and the execution of the remaining application(s) may continue. As a result, a two-dimensional image including the remaining application(s) with relatively high priority may be displayed.

Referring to FIG. 5, firstly, the step S310 of displaying a three-dimensional image with the executed applications arranged thereon is performed as explained with reference to FIG. 4. Afterwards, the step S320 of detecting the occurrence or not of an event associated with the mobile terminal 100 is performed. For example, the occurrence or not of a phone call, text reception, an alarm, etc. may be detected.

Upon detection of the occurrence of such an event, the step of terminating at least one of the executed applications based on the priority information and executing an event is performed. For example, upon detection of the occurrence of an event, at least one application with relatively low priority or with relatively high priority among the executed applications may be terminated. Then, an event is executed, and the execution of the remaining application(s) may continue.

Upon execution of an event, the priority information may be updated such that the executed event has higher priority than the executed applications. Alternatively, the priority information may be updated such that the executed event has lower priority than the executed applications. Also, the executed event may be arranged on the three-dimensional image in accordance with the update of the priority information. For example, the execute event may be arranged at the position on the three-dimensional image at which the terminated application was arranged. In other words, the executed event may substitute the terminated application. Moreover, upon termination of the execute event, the terminated application may be re-initiated.

In the embodiment of the present invention, upon termination of at least one of the executed applications, the priority information of the remaining application(s) may be updated. Then, the remaining application(s) may be re-arranged on the three-dimensional image in accordance with the updated priority levels. At least one application may be forcibly terminated according to a user instruction, or, as described above, may be terminated upon execution of an event. By the way, applications may be re-arranged on a two-dimensional image in the same manner as described for the three-dimensional image.

Figure 6A:
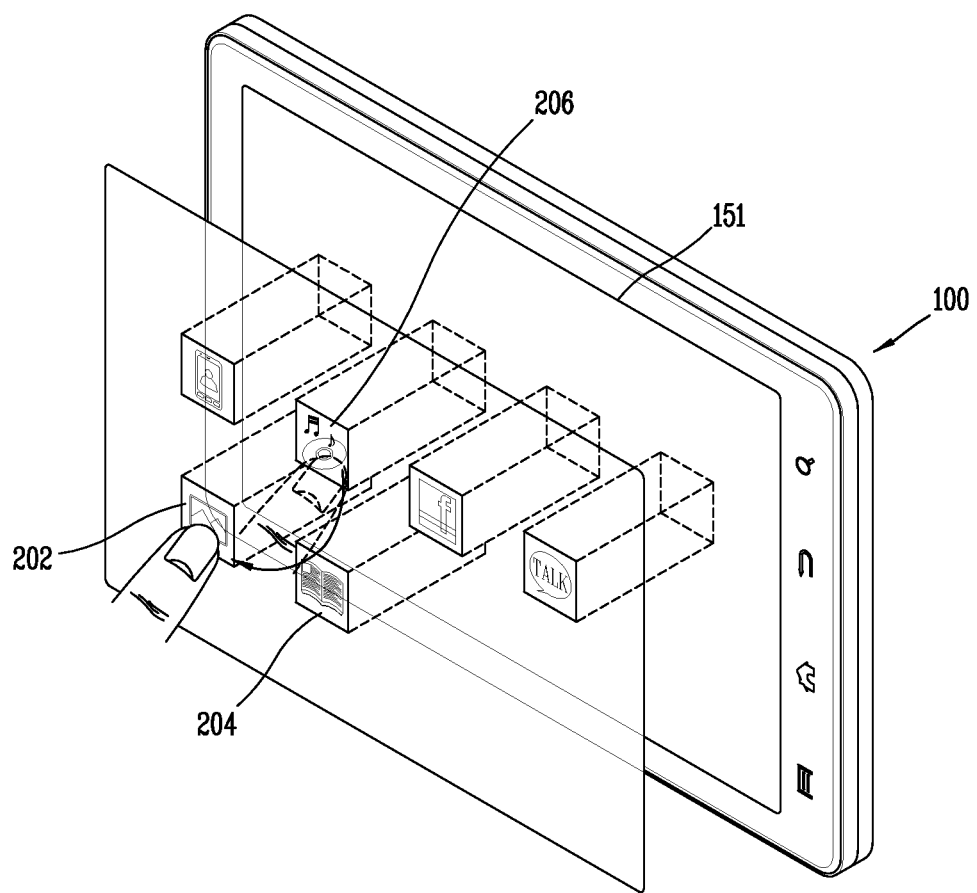
FIGS. 6A to 6D are conceptual diagrams showing a user interface employing a control method of a mobile terminal according to an embodiment of the present invention.
Figure 6B:
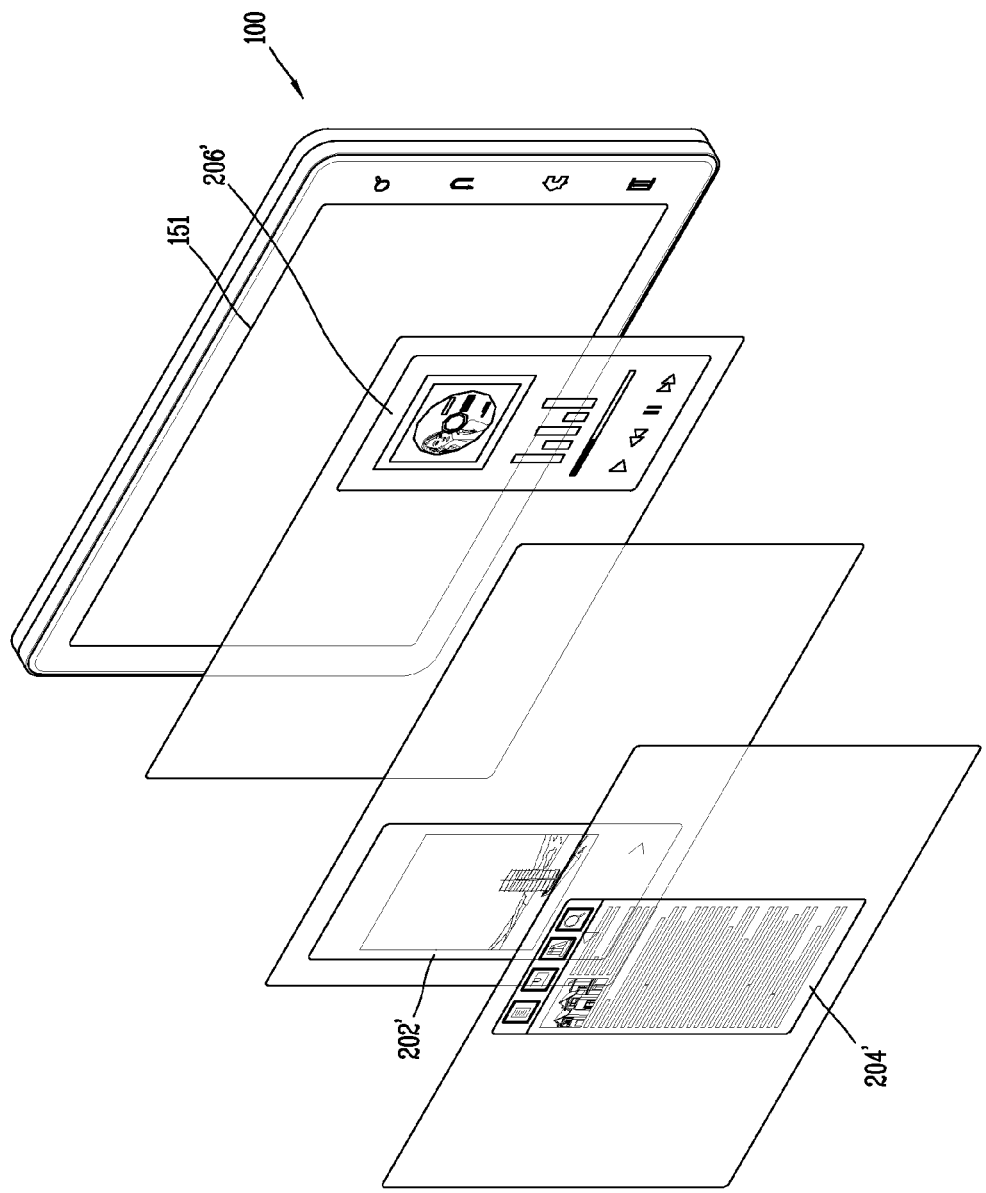

FIGS. 6A to 6D are conceptual diagrams showing a user interface employing a control method of a mobile terminal 100 according to an embodiment of the present invention. Referring to FIGS. 6A and 6B, the display unit 151 may display a three-dimensional image including a plurality of objects 202 to 206, for example, icons. Although, as used herein, a three-dimensional image, having an outwardly protruding shape, i.e., having a depth defined to be a positive number is illustrated, the three-dimensional image according to the embodiment of the present invention is not limited thereto but various modifications can be made. For instance, the display unit 151 may display a three-dimensional image, having an inwardly protruding shape, i.e., having a depth defined to be a negative number. Moreover, the display unit 151 may display a three-dimensional image having a combination of both of the outwardly and inwardly protruding shapes.

Upon detection of a selection of a plurality of objects 202 to 206 in response to a touch input (e.g., drag gesture input), the controller 180 (see FIG. 1) may simultaneously execute applications 202' to 206' respectively corresponding to the selected objects 202 to 206.

Such a multitasking operation may be performed in response to a single touch input after executing a specific mode (hereinafter, referred to as "multi-tasking mode") according to a user instruction. Alternatively, multi-tasking may be performed in response to a multi-touch input even before the execution of the multi-tasking mode. More specifically, when a plurality of objects 202 to 206 are selected by a multi-touch input before the execution of the multi-tasking mode, applications 202' to 206' corresponding to each of the selected objects 202 to 206 may be simultaneously performed. As used herein, the multi-touch input may include a first touch input corresponding to a static gesture input for indicating a point on the three-dimensional image and a second touch input corresponding to a dynamic gesture input for moving between the regions in which the plurality of objects 202 to 206 are displayed.

The controller 180 may generate priority information based on the property information of the executed applications 202' to 206'. For example, the controller 180 may generate priority information such that the first application 202', such as an album, for outputting mainly images has a lower priority level than the second application 204', such as an e-book, for outputting mainly text. Moreover, the controller 180 may generate priority information such that the first application 202' has a higher priority level than the third application 206', such as an MP3 player, for outputting mainly audio. In other words, the first priority may be given to the second application 204', the second priority to the first application 202', and the third priority to the third application 206'.

If at least some of the executed applications has the same property, the controller 180 may generate a pop-up window to allow the user to enter information for determining the priority levels of the applications having the same property. For instance, if the controller 180 determines that the first and second applications 202' and 204' have the same property because both of them output audio, it may generate a pop-up window to enter information for cancelling the execution of any one of the first and second applications 202' and 204' or information for determining the priority levels of the first and second applications 202' and 204'. By the way, a pop-up window may be generated on a two-dimensional image in the same manner as described for the three-dimensional image.

The controller 180 may arrange the executed applications 202' to 206' on the three-dimensional image based on position information mapped to the priority information. For example, the first to third positions of the three-dimensional image may be respectively mapped to the first to third priority levels. Accordingly, the first to third applications 202' to 206' may be respectively arranged at the first to third positions. As used herein, the first position is defined as a region at the center of the three-dimensional image, which protrudes most as compared to the other predefined positions, the second position is defined as a region at the left side of the three-dimensional image, which protrudes less than the first position, and the third position is defined as a region at the right side of the three-dimensional image, which protrudes less than the second position.

Although not shown, in the embodiment of the present invention, upon completion of the output of data allocated to one of the executed applications 202' to 206', the controller 180 may control the application so as to output at least some of data allocated to the other applications. For example, when the second application 204' completes the output of text allocated thereto while the first application 202' is outputting images allocated thereto, the controller 180 may control the second application 204' so as to output at least some of the images allocated to the first applications 202'.

Moreover, upon completion of the output of data allocated to one of the executed applications 202' to 206', the controller 180 may terminate the application. For example, when the third application 206' completes the output of audio (e.g., MPE files) allocated thereto, the controller 180 may terminate the third application.

In the embodiment of the present invention, the controller 180 may distribute hardware resources to the executed applications 202' to 206' based on the priority information. More specifically, the controller 180 selectively assign the executed applications the right to use communication means, audio output means (e.g., a speaker), storage means (e.g., a memory), etc. to the executed applications.

For instance, provided that both of the second and third applications 204' and 206' have to use a speaker to output audio, the controller 180 may assign the right to use a speaker to the second application 204' having a higher priority level than the third application 206'.

The display unit 151 may display information about the distribution status of hardware resources on each of the executed applications 202' to 206'. For example, the display unit 151' may display the memory capacity of each of the executed applications 202' to 206'. Moreover, the display unit 151' may display information representing whether each of the executed applications 202' to 206' is using communication means, audio output means, etc.

Figure 6C:
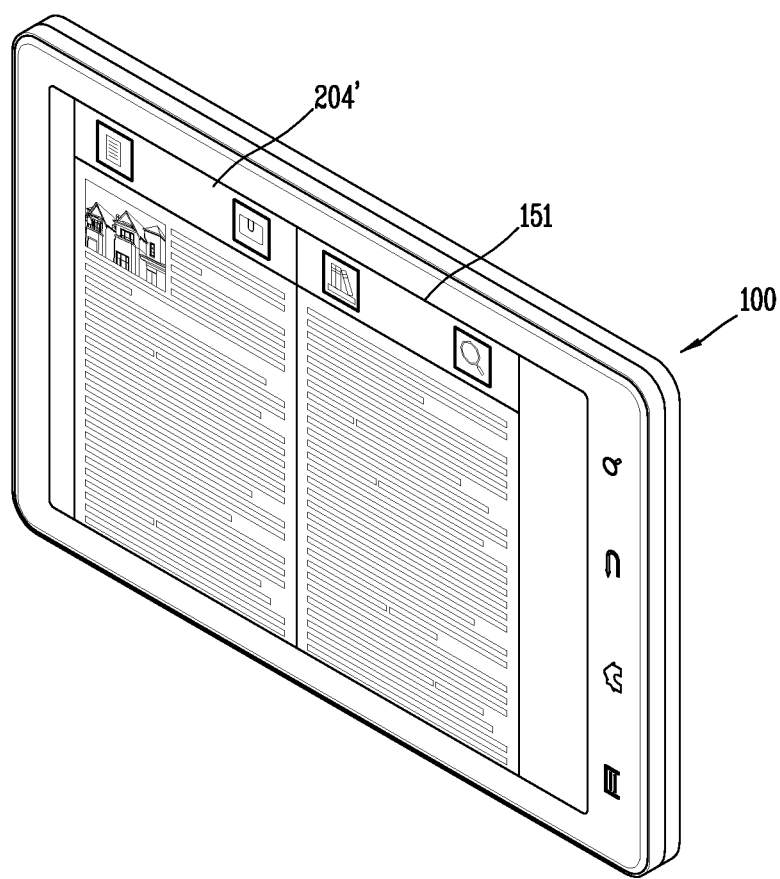

Referring to FIG. 6C, when the three-dimensional image on which the executed applications 202' to 206' are arranged is converted into a two-dimensional image, the controller 180 may terminate at least one of the executed applications 202' to 206' based on the priority information. For example, when the three-dimensional image is converted into a two-dimensional image, the controller 180 may terminate the first and third applications 202' and 206' with lower priority levels. Accordingly, the display unit 151 may display a two-dimensional image including the second application 204' with the highest priority level.

Figure 6D:
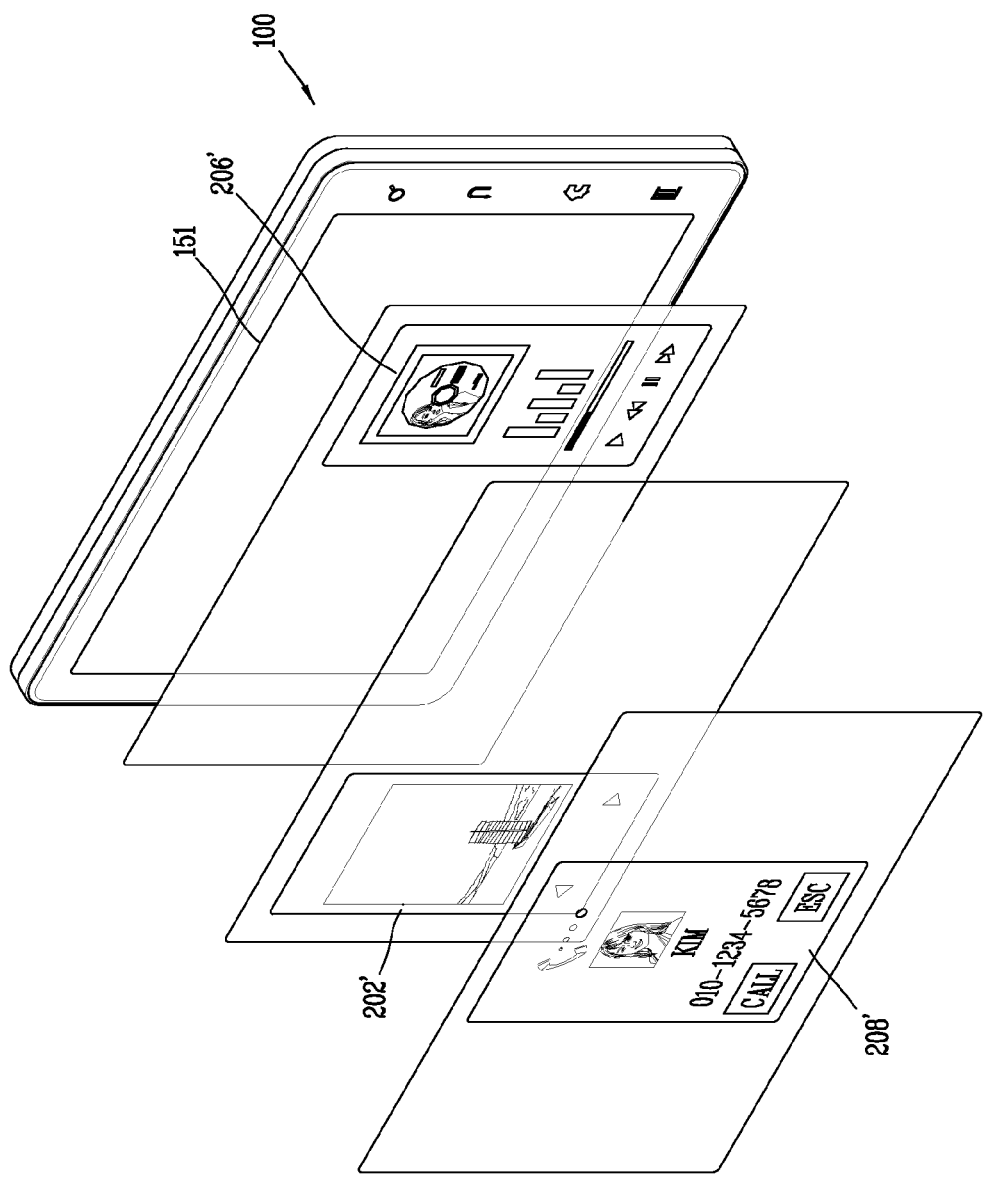

Referring to FIG. 6D, upon detection of the occurrence of an event 208' associated with the mobile terminal 100, for example, an incoming phone call, the controller 180 may terminate at least one of the executed applications 202' to 206' based on the priority information and execute the event 208'. For example, upon detection of the occurrence of the event 208', the controller 180 may terminate the second application 204' with the highest priority level and execute the event 208'. Then, the controller 180 may update the priority information such that the event 208' has a higher priority level than those of the first and third applications 202' and 206, for example, the same priority as the second application 204'. Also, the display unit 151 may display the event 208' at the first position on the three-dimensional image at which the second application 204' was arranged.

Although not shown, if the event 208' is terminated, the controller 180 may re-initiate the second application 204' that was terminated. Also, the display unit 151 may display the second application 204' again at the first position.

Figure 7:
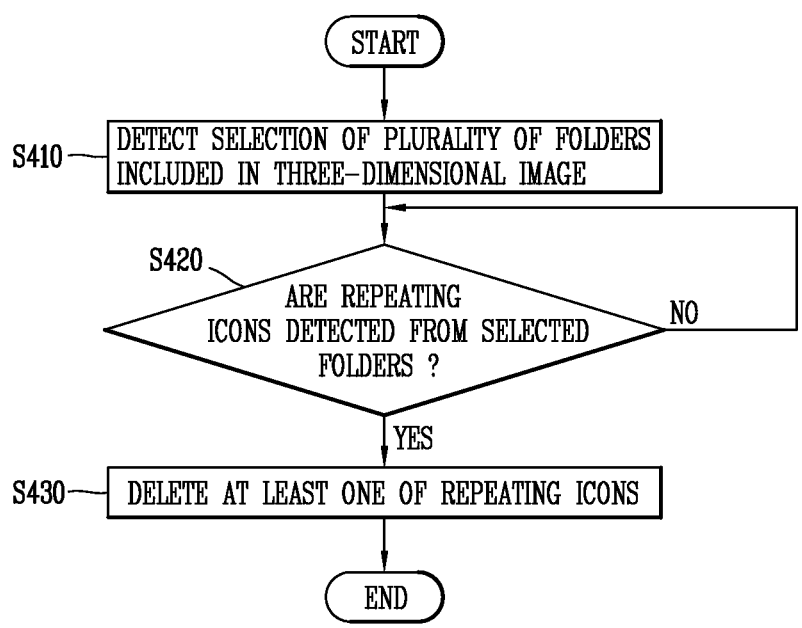
FIG. 7 is a sequential chart for explaining an embodiment of a control method of a mobile terminal associated with the present invention.

FIG. 7 is a sequential chart for explaining an embodiment of a control method of a mobile terminal 100 associated with the present invention. Referring to FIG. 7, firstly, the step S410 of detecting a selection of a plurality of folders included in a three-dimensional image in response to a touch input such as a drag gesture input is performed. As used herein, a folder is an object containing at least one icon or grouped icons, and may be referred to as a folder icon.

Thereafter, the step S420 of determining whether or not repeating icons are detected from selected folders is performed. When repeating icons are detected, the step S430 of deleting at least one of them is performed. As such, unnecessary repeating icons can be easily organized by a user gesture.

Figure 8A:
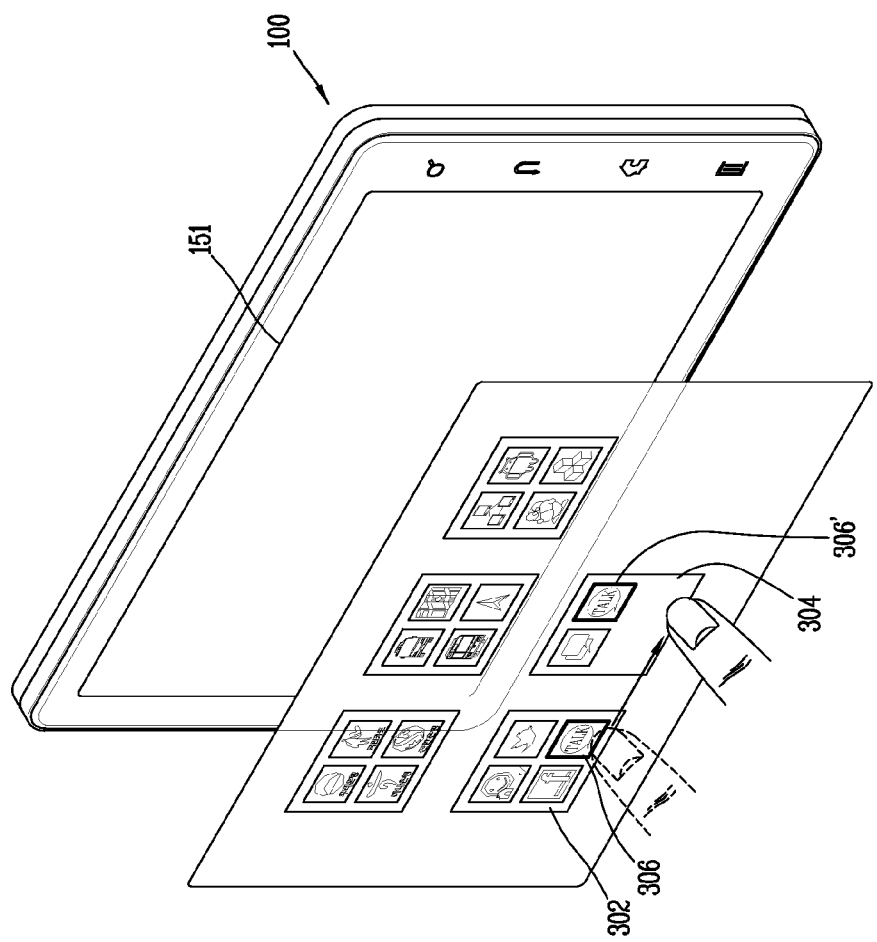

FIGS. 8A and 8B are conceptual diagrams showing a user interface of a mobile terminal 100 to which the control method shown in FIG. 7 is applied. Referring to FIG. 8A, the display unit 151 may display a three-dimensional image including a plurality of folders 302 and 304. Upon detection of a selection of the folders 302 and 304 in response to a drag gesture input, the controller 180 may detect repeating icons 306 and 306' from the selected folders 302 and 304. In this case, as shown in FIG. 8B, the controller 180 may delete at least one 306 of the repeating icons 306 and 306'.

Figure 9:
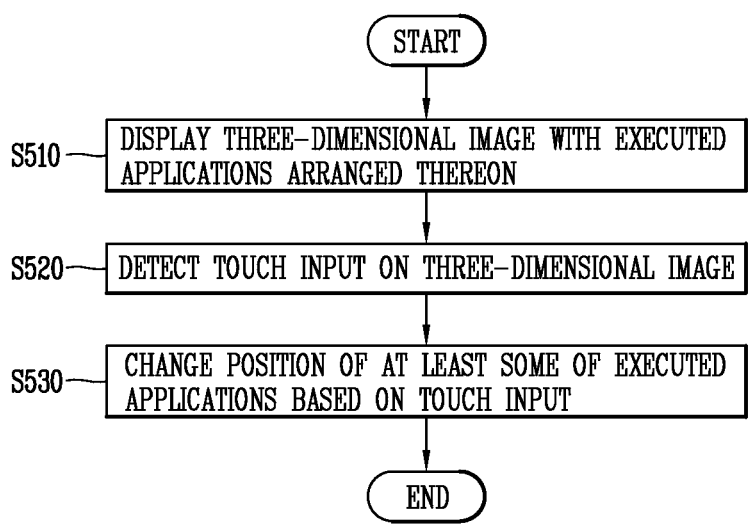
FIG. 9 is a sequential chart for explaining another embodiment of a control method of a mobile terminal associated with the present invention.

FIG. 9 is a sequential chart for explaining another embodiment of a control method of a mobile terminal 100 associated with the present invention. Referring to FIG. 9, firstly, the step S510 of displaying a three-dimensional image with executed applications arranged thereon is performed as explained with reference to FIG. 4. Afterwards, the step S520 of detecting a touch input on the three-dimensional image is performed. For example, a drag gesture input may be detected which moves one of the executed applications to the position at which another application is displayed. Next, the step S530 of changing the position of at least some of the executed applications based on the touch input is performed.

As described above, according to the present invention, after the executed applications are automatically arranged on the three-dimensional image based on the priority information, the applications arranged on the three-dimensional image may be manually re-arranged according to user preference.

Figure 10B:
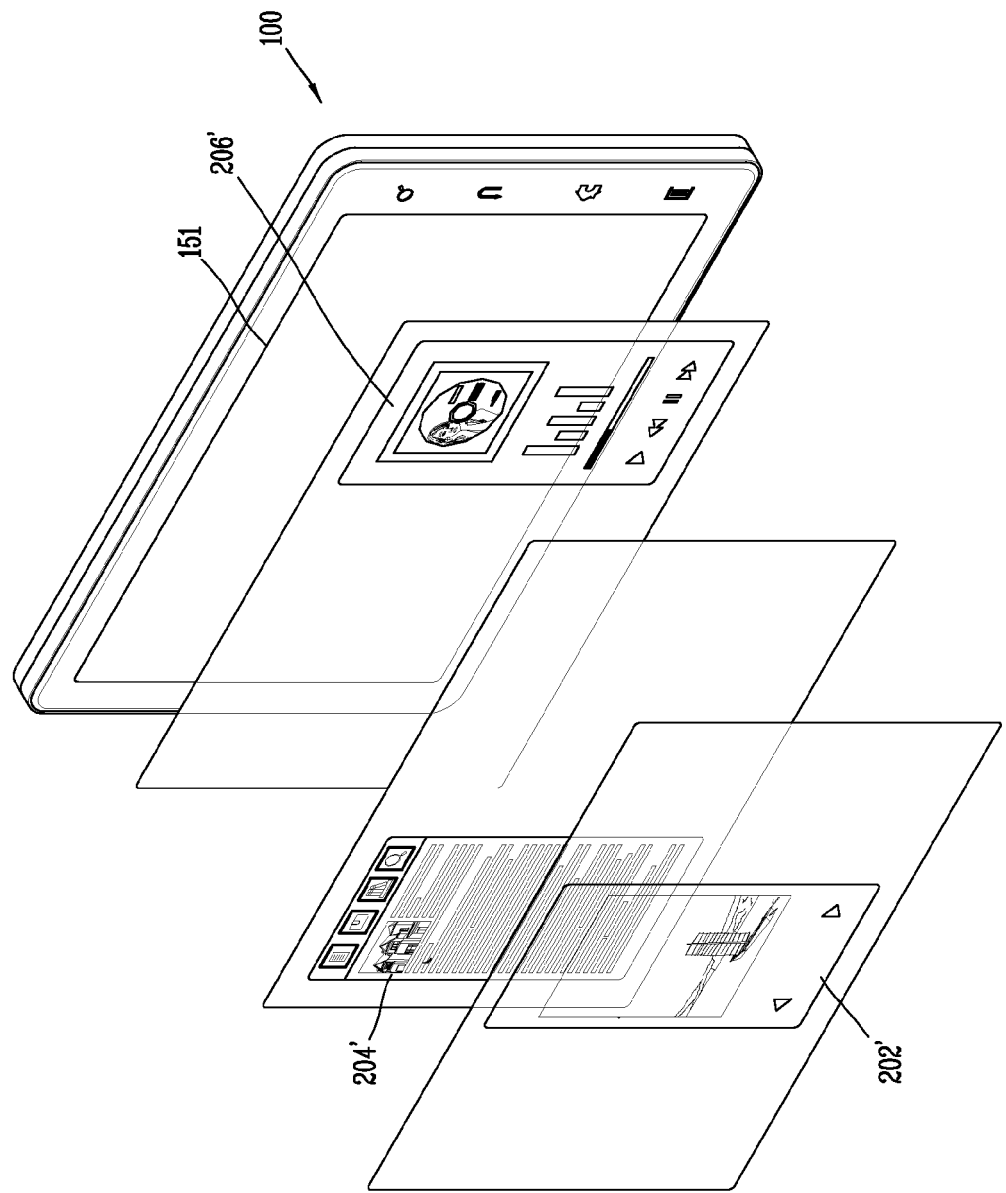

FIGS. 10A and 10B are conceptual diagrams showing a user interface of a mobile terminal employing the control method shown in FIG. 9 is applied. Referring to FIG. 10A, the display unit 151 may display a three-dimensional image including executed applications 202' to 206' as shown in FIG. 6A. Upon detection of a drag gesture input for moving the second application among the executed applications 202' to 206' to the position at which the first application 202' is displayed or in the corresponding direction, the controller 180 may switch the positions of the first and second applications 202' and 204' with each other, as shown in FIG. 10B.

Figure 11:
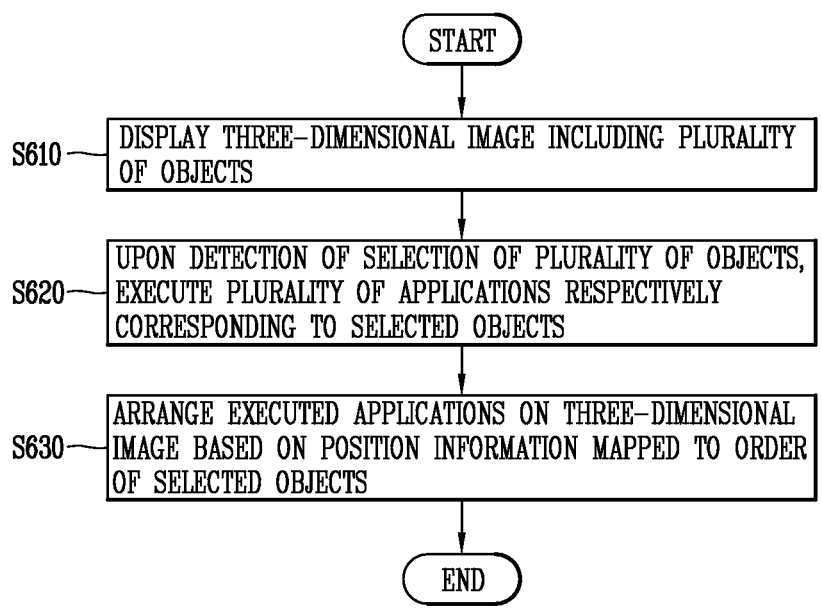
FIG. 11 is a sequential chart for explaining a control method of a mobile terminal according to another embodiment of the present invention.

FIG. 11 is a sequential chart for explaining a control method of a mobile terminal 100 according to another embodiment of the present invention. Referring to FIG. 11, the control method may include the step S610 of displaying a three-dimensional image including a plurality of objects and the step S620 of, upon detection of a selection of a plurality of objects (e.g., icons), executing a plurality of applications respectively corresponding to the selected objects.

Next, the step S630 of arranging the executed applications on the three-dimensional image based on position information mapped to the order of the selected objects is performed. This means that the priority levels of the executed applications may be set based on the order of the selected objects.

According to an embodiment disclosed in this specification, the above-described method can be implemented as a processor readable code on a medium recording a program. Examples of the processor readable medium include ROM, RAM, CD-ROMs, magnetic tapes, floppy disks, optical data storage devices, and so on, and may also be implemented in the form of carrier waves, such as transmission over the Internet.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a display configured to display information;
a memory configured to store information; and
a controller configured to:
cause the display to display a three-dimensional image comprising at least a plurality of objects;
detect a dynamic gesture input applied to the plurality of objects,
simultaneously execute a plurality of applications each corresponding to an object of the selected plurality of objects in response to the dynamic gesture input,
generate priority information comprising a priority level for each of the executed plurality of applications,
cause the display to display the executed plurality of applications such that they are arranged on the three-dimensional image based on position information corresponding to the generated priority information and a display depth of each of the executed plurality of applications on the three-dimensional image is set based on the position information,
wherein the priority level for each of the executed plurality of applications is determined based on property information stored in the memory for each of the executed plurality of applications,
wherein when at least two applications of the executed plurality of applications have the same property information, the priority level of the at least two applications is determined in response to a user selection, and
terminate at least one of the executed plurality of applications having a lowest priority level and continue execution of remaining applications of the executed plurality of applications having a higher priority level than the terminated at least one application when the three-dimensional image is converted into a two-dimensional image.

2. The mobile terminal of claim 1, wherein the controller is further configured to:
detect an event while the executed plurality of applications are displayed on the three-dimensional image;
terminate at least one of the executed plurality of applications based the generated priority information when the event is detected;
update the priority information such that the event has a higher priority level than the executed plurality of applications;
execute the event and cause the display to display the executed event on the three-dimensional image such that the displayed event is arranged according to the updated priority information; and
cause the display to cease displaying the terminated at least one application.

3. The mobile terminal of claim 2, wherein the controller is further configured to:
re-execute the terminated at least one of the plurality of applications when the executed event is terminated.

4. The mobile terminal of claim 1, wherein the controller is further configured to:
cause an application of the executed plurality of applications to output data from another application of the executed plurality of applications when an output of the application is complete while an output of the another application is incomplete.

5. The mobile terminal of claim 1, wherein the controller is further configured to:
distribute hardware resources to the executed plurality of applications based on the priority information.

6. The mobile terminal of claim 1, wherein:
the plurality of objects comprise a plurality of folders configured for grouping icons; and
the controller is further configured to:
detect repeating icons from the plurality of folders, and delete at least one of the repeating icons.

7. A control method of a mobile terminal, the method comprising:
displaying a three-dimensional image comprising at least a plurality of objects;
detecting dynamic gesture input applied to the plurality of objects;
simultaneously executing a plurality of applications each corresponding to an object of the selected plurality of objects in response to the dynamic gesture input applied to the plurality of objects;
generating priority information comprising a priority level for each of the executed plurality of applications;
displaying the executed plurality of applications such that they are arranged on the three-dimensional image based on position information corresponding to the generated priority information and a display depth of each of the executed plurality of applications on the three-dimensional image is set based on the position information;
wherein the priority level for each of the executed plurality of applications is determined based on property information stored in the memory for each of the executed plurality of applications;
wherein when at least two applications of the executed plurality of applications have the same property information, the priority level of the at least two applications is determined in response to a user selection, and
terminating at least one of the executed plurality of applications having a lowest priority level and continue execution of remaining applications of the executed plurality of applications having a higher priority level than the terminated at least one application when the three-dimensional image is converted into a two-dimensional image.

8. The method of claim 7, further comprising:
detecting an event while the executed plurality of applications is displayed on the three-dimensional image;
terminating at least one of the executed plurality of applications based the generated priority information when the event is detected;
updating the priority information such that the executed event has a higher priority level than the executed plurality of applications;
executing the event and displaying the executed event on the three-dimensional image such that the displayed event is arranged according to the updated priority information; and
ceasing display of the terminated at least one application.

9. The method of claim 8, further comprising:
re-executing the terminated at least one of the plurality of applications when the executed event is terminated.

10. The method of claim 7, further comprising:
causing an application of the executed plurality of applications to output data from another application of the executed plurality of applications when an output of data of the application is complete while an output of data of the another application is incomplete.

* * * * *